US010553378B2

(12) United States Patent
Pisu et al.

(10) Patent No.: US 10,553,378 B2
(45) Date of Patent: Feb. 4, 2020

(54) ELECTRICAL CIRCUIT BREAKER DEVICE WITH PARTICLE TRAP

(71) Applicant: ABB Schweiz AG, Baden (CH)

(72) Inventors: Francesco Pisu, Birmenstorf (CH); Mahesh Dhotre, Brugg (CH); Xiangyang Ye, Nesselnbach (CH); Johan Karl Filip Costyson, Wettingen (CH); Reto Karrer, Stäfa (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/139,912

(22) Filed: Sep. 24, 2018

(65) Prior Publication Data

US 2019/0035579 A1    Jan. 31, 2019

Related U.S. Application Data

(63) Continuation of application No. PCT/EP2017/056366, filed on Mar. 17, 2017.

(30) Foreign Application Priority Data

Mar. 24, 2016   (EP) ..................................... 16162355

(51) Int. Cl.
*H01H 33/70* (2006.01)
*H01H 33/74* (2006.01)
(Continued)

(52) U.S. Cl.
CPC ........ *H01H 33/7023* (2013.01); *H01H 33/74* (2013.01); *H01H 33/91* (2013.01);
(Continued)

(58) Field of Classification Search
CPC .... H01H 33/7023; H01H 33/74; H01H 33/91; H01H 33/72; H01H 33/7015; H01H 2033/888
(Continued)

(56) References Cited

U.S. PATENT DOCUMENTS

| 4,064,353 A | * | 12/1977 | Bolin | ..................... H02G 5/065 |
| | | | | 174/14 R |
| 4,335,268 A | * | 6/1982 | Dale | ..................... H02G 5/065 |
| | | | | 174/14 R |

(Continued)

FOREIGN PATENT DOCUMENTS

| CN | 1677786 A | 10/2005 |
| CN | 1941243 A | 4/2007 |

(Continued)

OTHER PUBLICATIONS

European Patent Office, International Search Report & Written Opinion issued in corresponding Application No. PCT/EP2017/056366, dated Jun. 12, 2017, 14 pp.

(Continued)

*Primary Examiner* — Edwin A. Leon
*Assistant Examiner* — William A Bolton
(74) *Attorney, Agent, or Firm* — Taft Stettinius & Hollister LLP; J. Bruce Schelkopf

(57) ABSTRACT

An electric switching device filled with a dielectric insulating medium includes first and second arcing contact, first exhaust volume downstream of first arcing contact and second exhaust volume downstream of second arcing contact. The exhaust volumes includes several first openings in their walls, through which the insulating medium exits into third volume. The third volume is arranged around the first or second exhaust volume and is radially delimited by the wall of the exhaust volumes and by an exterior wall having second openings through which the insulating medium exits the third volume. One baffle device is provided inside third volume such that vortex flow of the insulating medium is generated when it passes the baffle device on its way towards the second openings. Turbulent flow conditions are chosen such that gravitational force allows to trap or contributes to trap particles in the baffle device. The baffle device com- (Continued)

Figure 1:
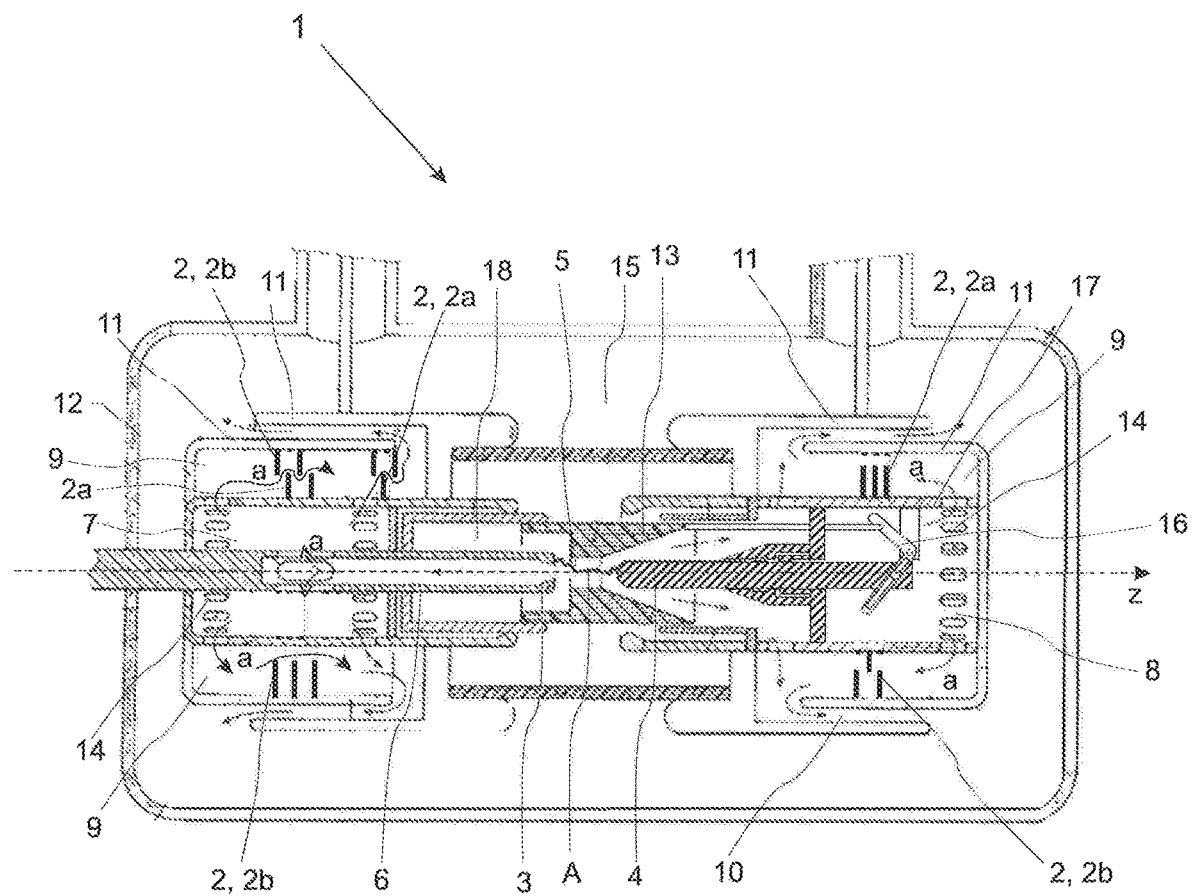

prises baffle plates or fins, that are arranged to form cavities for capturing the particles by gravitational force.

25 Claims, 5 Drawing Sheets

(51) Int. Cl.
*H01H 33/91* (2006.01)
*H01H 33/88* (2006.01)
*H01H 9/52* (2006.01)
*H02G 5/06* (2006.01)

(52) U.S. Cl.
CPC ....... *H02G 5/065* (2013.01); *H01H 2009/526* (2013.01); *H01H 2033/888* (2013.01)

(58) Field of Classification Search
USPC .................. 218/1, 51, 46, 48, 41, 57, 59
See application file for complete search history.

(56) References Cited

U.S. PATENT DOCUMENTS

| | | | | |
|---|---|---|---|---|
| 4,743,709 | A * | 5/1988 | Meyer | H02G 5/066 174/28 |
| 7,858,877 | B2 * | 12/2010 | Nowakowski | H02G 5/065 174/14 R |
| 8,389,886 | B2 * | 3/2013 | Dahlquist | H01H 33/74 218/45 |
| 8,519,293 | B2 * | 8/2013 | Kisanuki | H02G 5/068 218/13 |
| 8,546,687 | B2 * | 10/2013 | Tsurimoto | H02G 5/065 174/28 |
| 2007/0068904 | A1 | 3/2007 | Dahlquist et al. | |
| 2008/0053961 | A1 | 3/2008 | Grieshaber | |
| 2014/0209568 | A1 | 7/2014 | Cernat et al. | |

FOREIGN PATENT DOCUMENTS

| | | |
|---|---|---|
| CN | 1989671 A | 6/2007 |
| CN | 103828011 A | 5/2014 |
| DE | 102013209663 A1 | 11/2014 |
| EP | 2120244 A1 | 11/2009 |
| WO | 2014122084 A1 | 8/2014 |

OTHER PUBLICATIONS

European Patent Office, International Preliminary Report on Patentability issued in corresponding Application No. PCT/EP2017/056366, dated Mar. 7, 2018, 18 pp.

European Patent Office, Extended Search Report issued in corresponding Application No. 16162355.8, dated Aug. 18, 2016, 8 pp.

First Office Action issued in corresponding Chinese application No. 201780032268.5, dated Jun. 27, 2019, 14 pp.

\* cited by examiner

ELECTRICAL CIRCUIT BREAKER DEVICE WITH PARTICLE TRAP

TECHNICAL FIELD

The invention resides in the field of medium and high voltage switching devices, particularly circuit breakers, and relates to an electrical switching device, particularly a dead tank circuit breaker, according to the independent claim.

BACKGROUND

Electrical switching devices are well known in the field of medium and high voltage switching applications. They are e.g. used for interrupting a nominal current as well as currents originating from an electrical fault. For the purposes of this disclosure the term medium voltage refers to voltages from 1 kV to 72.5 kV and the term high voltage refers to voltages higher than 72.5 kV. The electrical switching devices, like said circuit breakers, may have to be able to carry high nominal currents of 3150 A to 6300 A and to switch very high short circuit currents of 31.5 kA to 80 kA at very high voltages of 72.5 kV to 1200 kV.

During interruption of a nominal or short circuit current within the electrical switching devices, the current commutates from the nominal contacts of the electrical switching device to its arcing contacts. They normally comprise as one arcing contact arcing contact fingers arranged around the longitudinal axis of the electrical switching device in a so-called arcing finger cage or tulip, and as a mating arcing contact a rod which is driven into the finger cage. However, there are also arrangements with two rods as arcing contacts, which are driven towards one another and are connected via their front faces during a closing operation.

During the opening or closing process of the electrical switching device an electric arc forms between the two arcing contacts. In order to interrupt the current, the electrical switching devices contain a dielectric fluid used as an insulating medium (e.g. $SF_6$ gas) and for quenching the electric arc. Consequently, a part of the fluid located in the region where the electric arc is generated, called arcing volume, is considerably heated up (to around 20,000-30,000° C.) in a very short period of time. This part of the fluid builds up a pressure and is ejected from the arcing volume into so-called exhaust volumes. Particles are generated during operations of the circuit breaker (due to mechanical friction, erosion and ablation). These particles reduce the dielectric withstand capability if they approach highly dielectrically stressed locations.

US 2007/0068904 A1 discloses a high-voltage circuit breaker having an exhaust system with baffle walls arranged therein in an alternating manner to enforce a meandering path of the exhaust gases.

EP 2 120 244 A1 discloses a high-voltage circuit breaker having an exhaust system with a serial arrangement of pairs of baffle plates. Each pair of baffle plates provides a radial gap such that exhaust gas moving in longitudinal axial direction through the exhaust system is locally forced in the gap to follow a radial flow direction. Between subsequent pairs of baffle plates intermediate volumes are formed. Due to the radial flow directions in subsequent gaps, the exhaust gas follows a macro-swirling flow path in each intermediate volume, which results in improved cooling of the exhaust gases.

US 2014/0209568 A1 discloses a circuit breaker having an exhaust system with baffle plates arranged therein. The baffle plates have openings for transmitting exhaust gases. The openings of subsequent baffle plates are aligned in straight lines of sight with one another.

DE 10 2013 209 663 A1 discloses a circuit breaker having an exhaust system with an intermediate volume that provides a meandering path for the exhaust gases.

The prior art baffle wall arrangements improve cooling of the exhaust gases by creating turbulent flow conditions. The turbulent flow conditions cause particles entrained with the exhaust gases to be transported through the baffle wall arrangements.

DESCRIPTION OF THE INVENTION

It is therefore an objective of the present invention to further improve an electrical switching device, particularly a dead tank circuit breaker, with respect to said disadvantages. Particularly, the invention aims to capture and store the particles at locations with low dielectric stress. This objective is achieved by the subject-matter of the independent claim. Embodiments are disclosed in the description, together with the appended figures, and in dependent claims and claim combinations.

This objective is solved by an electric switching device filled with a dielectric insulating medium and comprising at least an arrangement of arcing contacts with a first arcing contact and a corresponding second arcing contact. For opening and closing the electric switching device at least one of the arcing contacts is movable parallel to a longitudinal axis and cooperates with the other arcing contact. At least a first exhaust volume is provided downstream of the first arcing contact, and/or at least a second exhaust volume is provided downstream of the second arcing contact, with respect to a local flow direction of the insulating medium, in such a way that dielectric insulating medium can flow from an arcing volume arranged between the first and the second arcing contact into the first and/or the second exhaust volume. The first and/or the second exhaust volume comprise or comprises a plurality of first openings in its wall, through which the insulating medium can exit the first and/or the second exhaust volume into at least one third volume. The at least one third volume is arranged around the first exhaust volume and/or around the second exhaust volume and is delimited in radial direction with respect to the longitudinal axis at least partially by the wall of the first exhaust volume and/or of the second exhaust volume and by an exterior wall. The exterior wall has second openings through which the insulating medium exits the third volume towards an enclosure of the electric switching device. At least one baffle device is provided inside the third volume and is arranged in such a way that a vortex flow or turbulent flow of the insulating medium is generated while the insulating medium passes the baffle device on its way towards the second openings. The baffle device is a trap for particles transported by the dielectric insulating medium, wherein turbulent flow conditions are chosen such that gravitational force allows to trap or contributes to trap particles in the baffle device. The baffle device comprises baffle plates or fins that are arranged to form cavities for capturing the particles by gravitational force.

By providing a baffle device which generates a local vortex flow of the insulating medium it is possible to reach an increased deposition of particles transported by the insulating medium. In other words, the baffle device helps to "clean up" the insulating medium with respect to unwanted particles and therefore to avoid that such particles are carried into sensitive areas of the circuit breaker where they may cause the undesired effects mentioned at the beginning.

Thus, the baffle device can be regarded as "particle trap", creating regions where it is possible to retain the majority of particles. In this way the sensitivity of circuit breakers, particularly dead tank circuit breakers, to the effects of particle generation is reduced.

Preferably, the dielectric insulation medium used inside the circuit breaker is $SF_6$ or $CF_4$ or comprises an organofluorine compound selected from the group consisting of: fluoroethers, in particular hydrofluoromonoethers, fluoroamines, fluorooxiranes, fluoroketones, in particular perfluoroketones, fluoroolefins, in particular hydrofluoroolefins, fluoronitriles, in particular perfluoronitriles, and mixtures thereof, in particular in a mixture with a background gas.

SHORT DESCRIPTION OF THE DRAWINGS

Figure 2:
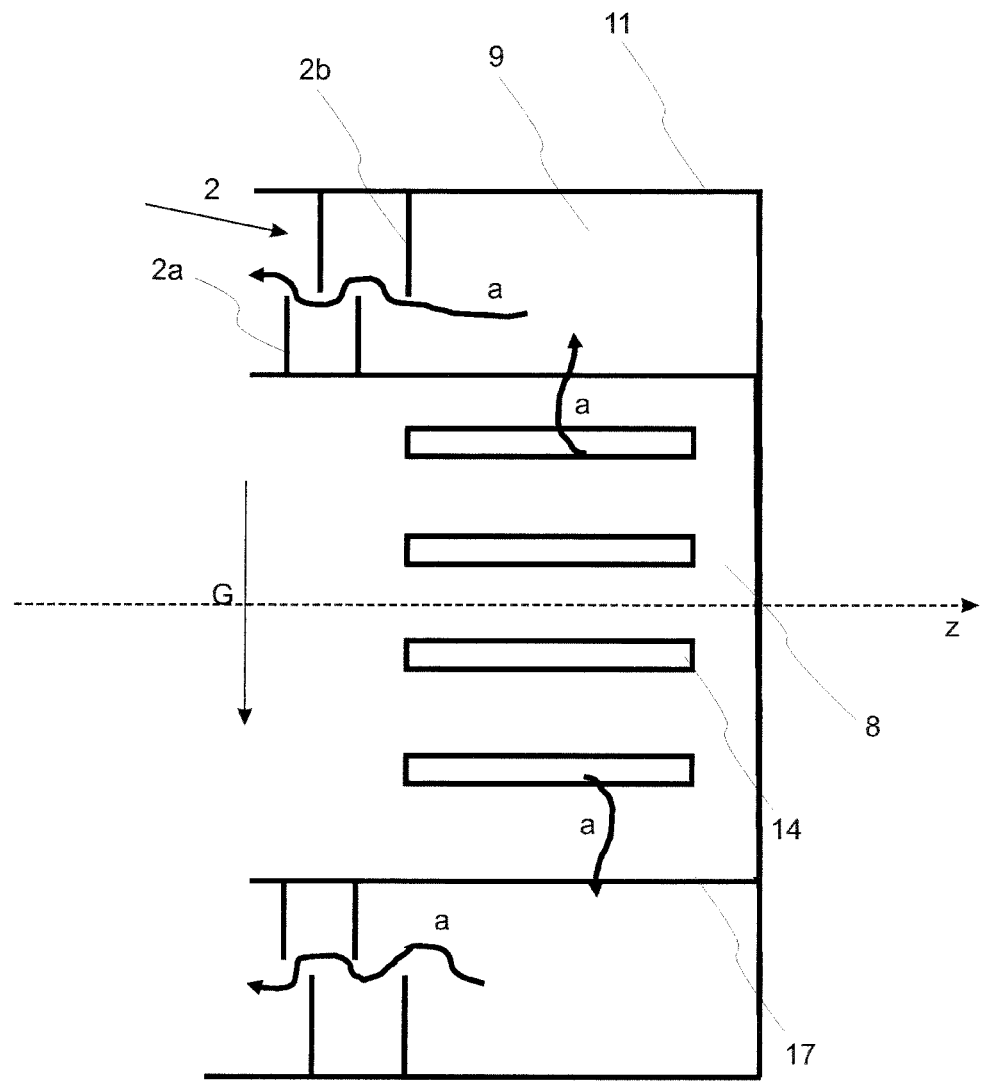
Figure 3A:
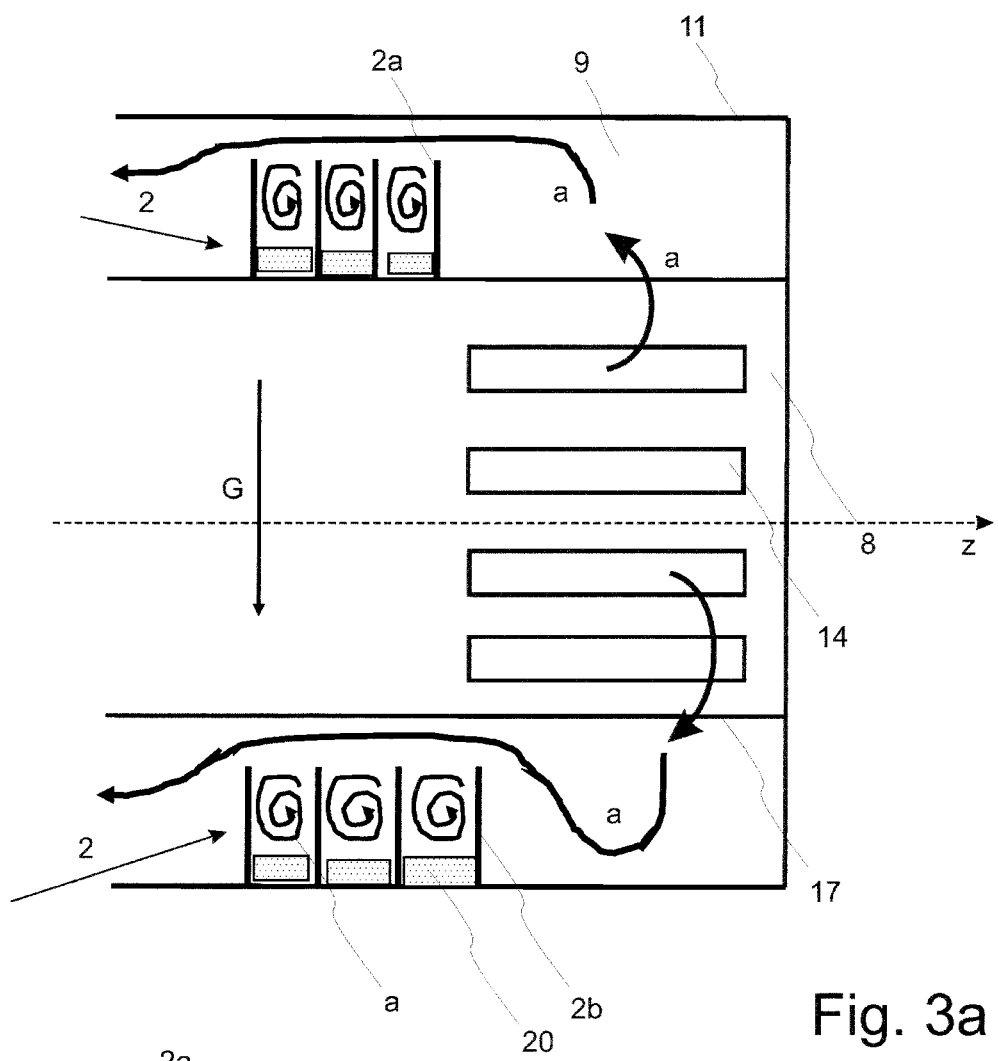
Figure 3B:
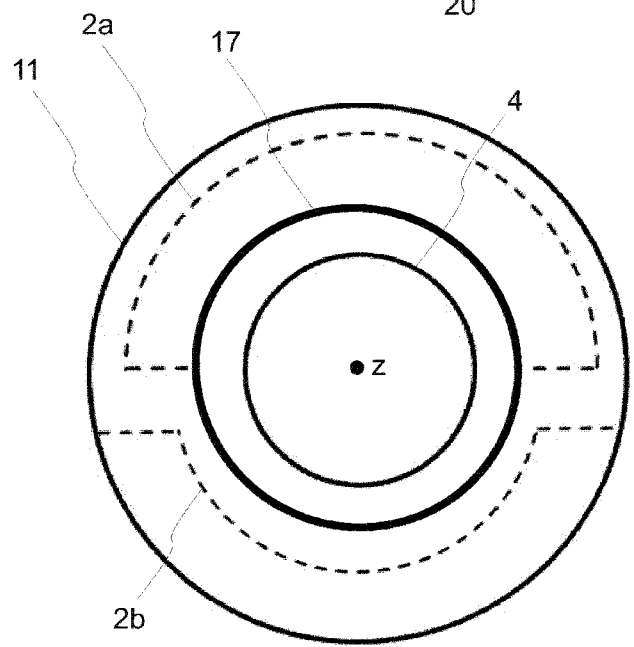
Figure 4:
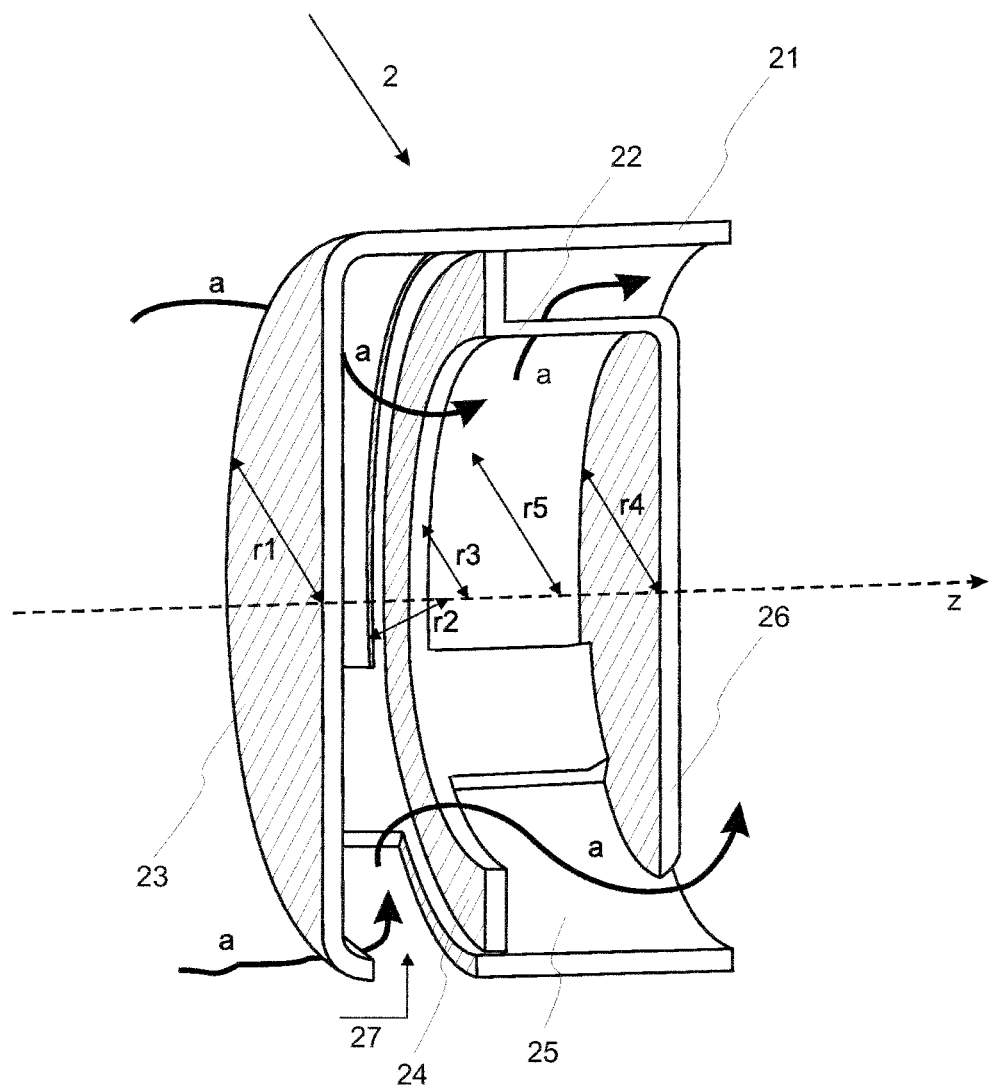
Figure 5A:
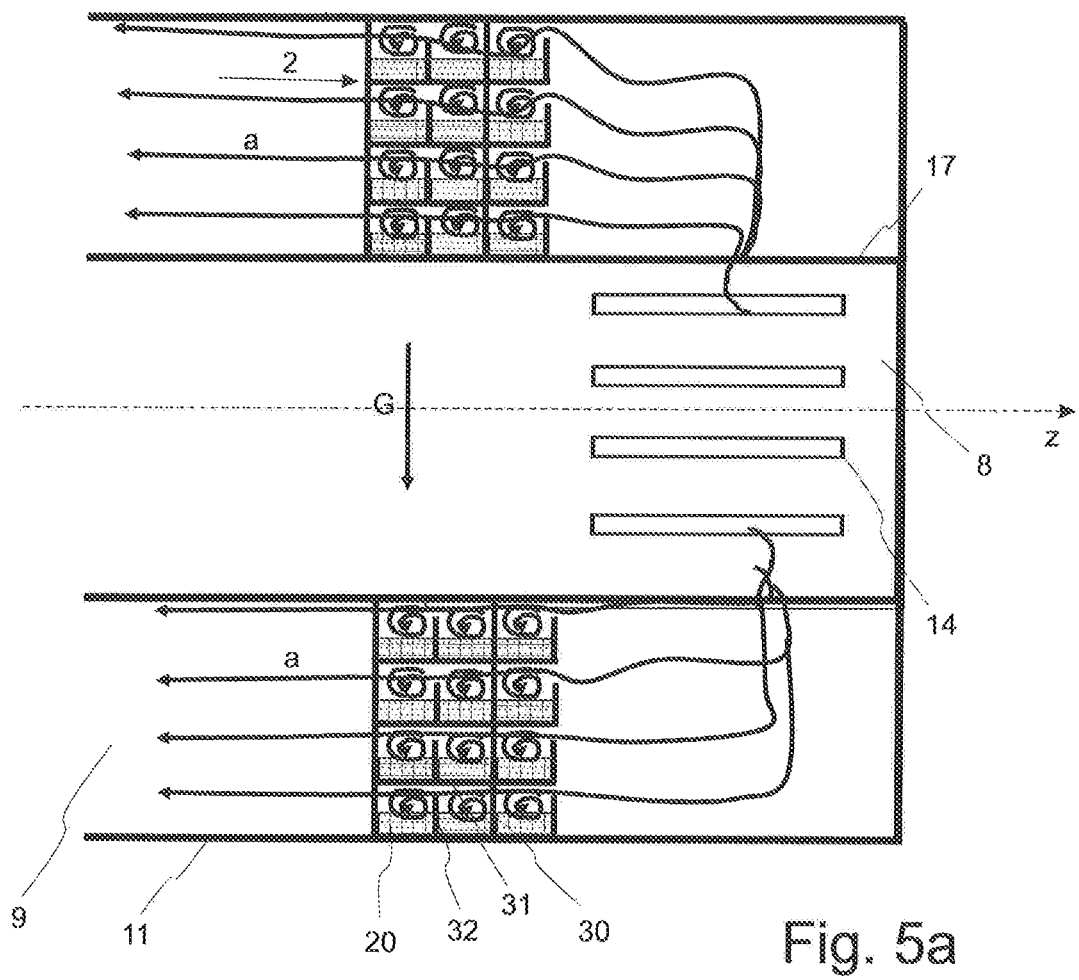
Figure 5B:
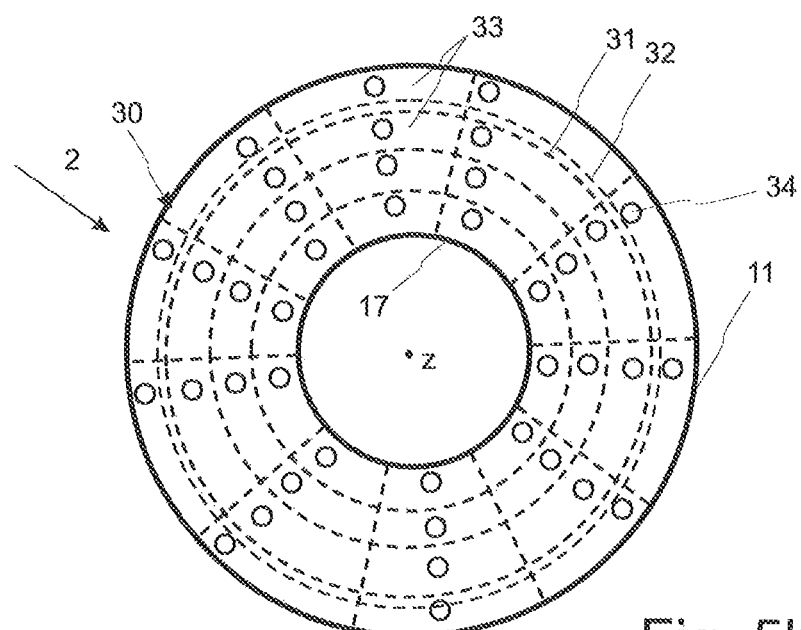

Embodiments, advantages and applications of the invention result from the dependent claims and from the now following description by means of the figures. It is shown in:

FIG. 1 a longitudinal sectional view of an exemplary electrical switching device according to the invention;

FIG. 2 a schematized side view of a first embodiment of a baffle device of the electrical switching device;

FIG. 3a a schematized side view of a second embodiment of a baffle device of the electrical switching device;

FIG. 3b a schematized front view of the baffle device of FIG. 3a;

FIG. 4 a schematized side view of a third embodiment of a baffle device of the electrical switching device;

FIG. 5a a schematized side view of a fourth embodiment of a baffle device of the electrical switching device; and FIG. 5b a front view of the embodiment of FIG. 5a.

In the drawings same references denote same or similarly acting components.

WAYS OF CARRYING OUT THE INVENTION

It is noted that elements of the different embodiments of the baffle device described herein are annular, forming either a complete annulus around the longitudinal axis z or a section of an annulus. For example, the term "plate" refers to an annular element having the shape of a washer. In other words, the thickness of the plate is greater than its width. The term "ring" also refers to an annular element, however, typically for a ring, the thickness of which being smaller than its width.

The terms "exterior" or "outer" or "inner" are based on a radial direction from the longitudinal axis of the circuit breaker 1.

Terms like "above", "below", "top", "bottom" or the like are referenced to the gravitational force.

FIG. 1 shows a longitudinal sectional view of an exemplary electrical switching device according to the invention in an opened configuration (arcing contacts are not connected). The device is rotationally symmetric about a longitudinal axis z. Not all elements of the circuit breaker 1 are described herein, as the principle and the variants of such circuit breakers are known to the skilled person in high voltage electrical engineering.

The circuit breaker 1 comprises an arcing contact arrangement formed by a first arcing contact 3 and a second arcing contact 4. The first arcing contact 3 comprises multiple fingers arranged in a finger cage (tulip configuration). For the sake of clarity only two fingers of the first arcing contact are shown in FIG. 1. The second arcing contact 4 is rod-shaped in this embodiment.

It is assumed that an insulating fluid of the type mentioned above is present inside the circuit breaker 1.

For the explanatory purposes of the present invention it is assumed that only the first arcing contact 3 is movable by means of a drive (not shown) along the z-axis and the second arcing contact 4 is stationary. However, the invention is not limited to this configuration. Other configurations, e.g. double-motion interrupters including an auxiliary drive 16, are known and are useful for implementing the invention disclosed and claimed herein, in which interrupters also the second arcing contact 4 is movable.

An insulating element 13 is arranged partly around the second arcing contact 4. In other words, the insulating element 13 encloses the second arcing contact 4 concentrically and protrudes beyond it, as can be seen in the FIG. 1. This insulating element 13 is also known as insulating nozzle 13. A main purpose of this insulating nozzle 13 is to form a constriction or flow path, in combination with other elements of the circuit breaker 1, for guiding the insulating fluid into and out of an arcing volume 5.

The arcing volume 5 is a region in which the second arcing contact 4 is moved back and forth for closing or opening the arcing circuit 1. As known, in this region an electric arc A develops during an opening and closing procedure between the first arcing contact 3 and the second arcing contact 4, which heats up the insulating medium located in the arc volume 5. This region is defined by an inner wall of the insulating nozzle 13 and by the front extremity of the second arcing contact 4 and the frontal extremities of the fingers of the first arcing contact 3. The arcing volume 5 is connected, amongst others, with a heating volume 18 in such a way that the insulating medium can travel between heating volume 18 and arcing volume 5.

Furthermore, the arcing volume 5 is also connected to a first exhaust volume 7, the purpose of which has been described above, via an exhaust tube 6. The exhaust tube 6 is a prolongation of the first arcing contact 3, as can be seen in the figure. The hot insulating medium, in the following also referred to as gas or exhaust gas, travels through the exhaust tube 6, as shown by the arrows a, and escapes into the first exhaust volume 7 through openings in the wall of the exhaust tube 6. Subsequently, mixed hot gas from the arcing volume 5 and cold gas from the first exhaust volume 7 escape into a third volume 9, which is delimited by an exterior wall 11, via first openings 14. The exterior wall 11 has a passage 10 (or second opening 10) permitting the mixed gas to escape into an exterior volume 15 delimited by an enclosure 12 of the circuit breaker 1.

The arcing volume 5 is also connected to a second exhaust volume 8, the purpose of which has been described above. The hot gas travels into the second exhaust volume 8 via channels passing around the second arcing contact 4. Subsequently, mixed hot gas from the arcing volume 5 and cold gas from the second exhaust volume 8 escape into another third volume 9, which is delimited by another exterior wall 11, via first openings 14. The exterior wall 11 has a passage 10 (or second opening) permitting the mixed gas to escape into the exterior volume 15 delimited by the enclosure 12 of the circuit breaker 1.

It is mentioned that the circuit breaker 1 may also contain only one exhaust volume and therefore only one third volume 9. For the purposes of this document a reference to the third volume 9 in connection with "the first and/or the second exhaust volume 7, 8" is understood in the way that an individual third volume 9 is attributed to each of the exhaust volumes 7, 8 and not that a single third volume is attributed to both exhaust volumes, as it has been illustrated in FIG. 1.

The present invention focuses on the part of the circuit breaker 1 comprising the exhaust volumes 7, 8 and the third volumes 9 for reaching the above mentioned objective. Therefore, for clarity reasons, the following figures only show this part and not the entire circuit breaker 1.

As can be seen in FIG. 1, baffle devices 2 comprising a plurality of fins 2a, 2b are arranged inside the third volumes 9. For illustration purposes different types of baffle devices according to exemplary embodiments of the invention are shown in the circuit breaker 1 of FIG. 1. It is however preferred to use the same type of baffle devices 2 in one circuit breaker.

FIG. 2 shows a schematized side view of a first embodiment of a baffle device 2 of the electrical switching device 1. The figure only shows a detail of the second exhaust volume 8. However, the following description can also apply to the exhaust volume 7. Generally, the baffle device 2 may comprise at least one first fin 2a attached to the wall of the first and/or the second exhaust volume 7, 8 and protruding inside or into the third volume 9, and/or at least one second fin 2b attached to the exterior wall 11 of the third volume 9 and protruding inside or into the third volume 9. The at least one first and the at least one second fin 2a, 2b are shifted with respect to one another in direction of the longitudinal axis z. In the present example, two first fins 2a and two second fins 2b are used. The first and the second fins 2a, 2b are annular plates surrounding the respective exhaust volume 7, 8.

The insulating medium flows out of the second exhaust volume 8 into the third volume 9 via the elongated first openings 14, as illustrated by the respective arrows a. Thereafter, the insulating medium travels towards the passage 10 (FIG. 1), thereby traversing the third volume 9 and passing through the baffle device 2. In this context it is noted that the general term used herein is "the insulating medium passes the baffle device". This encompasses the present variant that the insulating medium passes "through" the baffle device, namely between the fins 2a, 2b of the baffle device 2. In another variant (FIG. 3a, 3b) the term also encompasses that the insulating medium passes "by" the baffle device 2, namely between the fins 2a of the baffle device 2 and one of the delimiting walls of the third volume 9.

As can be seen from FIG. 2, the first and the second fins 2a, 2b of the baffle device 2 protrude into the third volume 9 to such an extent that the insulating medium has no straight trajectory when passing through the baffle device 2. This is illustrated by the meandering (horizontal) arrow a. In this way turbulences are created in pockets between the two first fins 2a and the two second fins 2b. On the one hand this makes it possible that the particles drop into the pockets formed by the two first fins 2a by effect of the gravitational force G in the top region of the third volume 9. On the other hand the particles drop into the pockets formed by the two second fins 2b by effect of the gravitational force G in the bottom region of the third volume 9. Thus, in the top part the first fins 2a not only have the task of creating the turbulence but also of retaining the particles in the pockets formed by them, whereas the second fins 2b only have the task of creating the turbulences. In the bottom area the tasks are reversed between the first and the second fins 2a, 2b. As the fins 2a, 2b are annular, particles retained in side areas between the top and the bottom area fall down in a guided manner, due to the gravitational force, and are collected in the pockets formed by the second fins 2b in the bottom area of the third volume 9.

For the embodiment of FIG. 2 it is preferred that the fins 2a, 2b are plate-shaped and extend along an entire circumference of the respective wall they are attached to, but they may also extend along only a section of the respective wall.

For this and the subsequent embodiments it is preferred that the baffle device 2 is arranged perpendicularly to the longitudinal axis z, i.e. perpendicular to the main flow direction z of the insulating medium.

FIG. 3a shows a schematized side view of a second embodiment of a baffle device 2 of the circuit breaker 1, and FIG. 3b shows a frontal view of the embodiment of FIG. 3a. FIG. 3a, 3b only show a detail of the second exhaust volume 8. However, the following description also applies to the exhaust volume 7. In this embodiment the at least one baffle device 2 generally comprises at least two first fins 2a (in this example four first fins 2a) and/or at least two second fins 2b (in this example four second fins 2b). The first fins 2a and the second fins 2b protrude into the third volume 9 to such extent that a straight passage for the insulating medium is formed above the fins 2a, 2b. In case of the first fins 2a this passage is formed between free ends of the first fins 2a and the exterior wall 11 of the third volume 9, which faces the free ends of the first fins 2a. In case of the second fins 2b this passage is formed between free ends of the second fins 2b and the wall 11 of the exhaust tube 8, which faces the free ends of the second fins 2b. This is illustrated by arrows a.

The first fins 2a are arranged on a top portion of the wall 17 of the first exhaust volume and/or the second exhaust volume 7, 8, with respect to the gravitational force G, particularly on the top half of said wall 17. Alternatively or additionally, the second fins 2b are arranged on a bottom portion of the exterior wall 11 of the third volume 9, with respect to the gravitational force G, particularly on the bottom half of said wall 11. This arrangement is best seen in FIG. 3b. As mentioned in the context of FIG. 2, turbulences are created in the pockets formed by the fins, as illustrated by the swirling arrows. The particles 20 transported by the insulating medium accumulate in the areas shown in FIG. 3a. Generally, the areas of particles accumulation described in connection with FIG. 2 also apply in this embodiment and all subsequent embodiments.

FIG. 4 shows a schematized side view of a third embodiment of a baffle device 2 of the circuit breaker 1. For clarity reasons the environment of the baffle device 2 as shown in FIG. 2 or 3 is not shown. In this embodiment the baffle device 2 is arranged around the first exhaust volume 7 and/or the second exhaust volume 8 and comprises an outer element 21 and an inner element 22.

The outer element 21 has an annular attachment ring 25 and a first annular stopper plate 23. The outer element 21 is attached on one side to the exterior wall 11 of the third volume 9 by means of the annular attachment ring 25, such that no insulating medium can pass between the annular attachment ring 25 and said exterior wall 11. The first annular stopper plate 23 is attached to the annular attachment ring 25 by at least a first bridge such that a slit 27 is formed at its radially outer extremity and is attached to the wall 17 of the respective exhaust volume 7, 8 without forming a slit. An outer radius r1 of the first stopper plate 23 is smaller than an outer radius r2 of the annular attachment ring 25. In other words, the outer radius r2 of the annular attachment ring 25 coincides with the inner radius of the exterior wall 11. The first annular stopper plate 23 leaves a first space between its outer extremity and the exterior wall 11.

The inner element 22 is attached to the annular attachment ring 25 inside the outer element 21 and comprises an annulus 24 and a second annular stopper plate 26 attached to the annulus 24 by means of at least a second bridge. An inner radius r3 of the annulus 24 is smaller than the outer radius r1 of the first annular stopper plate 23, and an outer radius r4 of the second annular stopper plate 26 is smaller than an inner radius r5 of the annular attachment ring 25. In other words, a second space is formed between the second annular stopper plate 26 and the annular attachment ring 25. The annulus 24 may also be regarded as a stopper plate, however with reduced stopping capability as compared to the first or the second stopper plate 23, 26, which is intended.

The passage of the insulating medium through the baffle device 2 of this embodiment will be explained in the following. It is noted that the orientation of the exemplary baffle device 2 in the figure is such that the baffle device 2 would be used for the first exhaust volume 7, as the insulating medium is shown to flow from left to right, as denoted by the arrows a. For the second exhaust volume 8, the baffle device would be turned around, that is, mirrored to a plane perpendicular to the longitudinal axis z. Thus, the insulating medium hits the first annular stopper plate 23 and is deflected towards the exterior of the plate 23 such that it passes through the first space. This deflection effects a first accumulation of particles at the first stopper plate 23. Then, the deflected insulating medium travels into the interior of the baffle device 2 (i.e. the outer element 21) through the slit 27 and hits the annulus 24, thereby causing a further accumulation of particles at the annulus 24. Subsequently, the insulating medium passes the annulus 24 and hits the second stopper plate 26 causing yet another particle accumulation at the second stopper plate 26. Finally, it is deflected towards the outer extremity of the second stopper plate 26 and escapes the baffle device 2 through the second space. As can be seen, the baffle device 2 creates a labyrinth causing turbulences in the flow of the insulating medium. In this embodiment there are three stages of particle accumulation before the insulating medium exits the baffle device 2.

FIG. 5a shows a schematized side view of a fourth embodiment of a baffle device 2 of the circuit breaker 1, and FIG. 5b shows a schematized front view of the embodiment of the baffle device 2 according to FIG. 5a. The figure only shows a detail of the second exhaust volume 8. However, the following description also applies to the first exhaust volume 7. The baffle device 2 comprises a plurality of plates 30 (here two plates) connecting the exterior wall 11 of the third volume 9 with the wall 17 of the second exhaust tube 8. The plates 30 are arranged transversally, preferably perpendicularly, to the longitudinal axis z.

It is preferred that the plates 30 are connected to one another by at least a ring 31 concentric to the longitudinal axis z, such that at least two compartments 33 are formed on each side of the ring 31 in radial direction (i.e. radially separated compartments).

In embodiments, at least a part of the compartments 33 is divided into at least two sub-compartments by at least a delimiting plate 32, in such a way that the sub-compartments of each compartment 33 are not geometrically entirely separated from one another and are fluidically connected. This measure is preferred in order to additionally increase turbulences in the so-formed pockets. However, it is also possible to do without the delimiting plates 32, such that the compartments 33 are not divided.

Each plate 30 has at least one opening 34 (or axial compartment openings 34, best seen in FIG. 5b) allowing flow passage of the insulating medium through the plate 30, preferably a plurality of openings 34 being attributed to each compartment 33. In the example of FIG. 5a, 5b each plate 30 has ten openings 34 per (radially separated) compartment 33, with a total of 40 openings 34 for this exemplary four-compartment 33 configuration.

It is particularly preferred that the openings 34 of the plates 30 are arranged such that the insulating medium has no straight trajectory when passing through the baffle device 2. This can be best seen in FIG. 5b. If a second plate 30 would be overlaid onto the plate shown in FIG. 5b, the openings (i.e. axial compartment openings 34) of the second plate wouldn't match the openings (i.e. axial compartment openings 34) of the illustrated plate 30, that is, the openings 34 of the second plate would be shifted or be rotated by an angle around the longitudinal axis z; however in particular the openings 34 attributed to the same compartment 33 are preferably at the same radial distance from the longitudinal axis z. It is noted that this rotational misalignment is not mandatory, but preferable to improve turbulence inside the compartments. A straight trajectory through the openings 34 would also lead to turbulences, however to less pronounced turbulences.

As can be seen in FIG. 5a, a delimiting plate 32 can also be used as first impact plate for the insulating medium instead of a plate 30. It is also possible to arrange a delimiting plate (not shown) at the exit of the insulating medium out of the baffle device 2.

For the purposes of this disclosure the fluid used in the encapsulated or non-encapsulated electric apparatus can be $SF_6$ gas or any other dielectric insulation medium, may it be gaseous and/or liquid, and in particular can be a dielectric insulation gas or arc quenching gas. Such dielectric insulation medium can for example encompass media comprising an organofluorine compound, such organofluorine compound being selected from the group consisting of: fluoroethers, in particular hydrofluoromonoethers, fluoroamine, fluorooxirane, fluoroketones, in particular perfluoroketones, fluoroolefins, in particular hydrofluoroolefins, fluoronitriles, in particular perfluoronitriles, mixtures thereof; and preferably being a fluoroketone and/or a fluoroether, more preferably a perfluoroketone and/or a hydrofluoroether. Herein, the terms "fluoroether", "fluoroamine" and "fluoroketone" refer to at least partially fluorinated compounds. In particular, the term "fluoroether" encompasses both hydrofluoroethers and perfluoro-ethers, the term "fluoroamine" encompasses both hydrofluoro-amines and perfluoroamines, and the term "fluoroketone" encompasses both hydrofluoroketones and perfluoroketones. It can thereby be preferred that the fluoroether, the fluoroamine, the fluoroketone, the oxirane and the fluoronitrile are fully fluorinated, i.e. perfluorinated.

In particular, the term "fluoroketone" as used in the context of the present invention shall be interpreted broadly and shall encompass both fluoromonoketones and fluorodiketones or generally fluoropolyketones. The term shall also encompass both saturated compounds and unsaturated compounds including double and/or triple bonds between carbon atoms. The at least partially fluorinated alkyl chain of the fluoroketones can be linear or branched and can optionally form a ring.

In particular, the fluoroketone can be a fluoromonoketone and/or may also comprise heteroatoms, such as at least one of a nitrogen atom, oxygen atom and sulphur atom, replacing one or more carbon atoms. More preferably, the fluoromonoketone, in particular perfluoroketone, shall have from 3 to 15 or from 4 to 12 carbon atoms and particularly from 5 to 9 carbon atoms. Most preferably, it may comprise exactly 5 carbon atoms and/or exactly 6 carbon atoms and/or exactly 7 carbon atoms and/or exactly 8 carbon atoms.

The dielectric insulation medium can further comprise a background gas or carrier gas different from the organofluorine compound, in particular different from the fluoroether, the fluoroamine, the fluoroketone, the oxirane, the olefin or hydrofluorolefin and the fluornitril, and preferably can be selected from the group consisting of: air, $N_2$, $O_2$, $CO_2$, a noble gas, $H_2$; $NO_2$, NO, $N_2O$, fluorocarbons and in particular perfluorocarbons and preferably $CF_4$, $CF_3I$, $SF_6$, and mixtures thereof. The switching device can be selected from the group consisting of: circuit breaker, generator circuit breaker, load break switch, disconnector.

To summarize, the present invention in all its embodiments provides solutions for reducing the risk that particles generated due to stress caused by moving parts of the circuit breaker 1 are carried and spread throughout the circuit breaker 1 by the insulating medium. In this way it is possible to achieve a "controlled" accumulation of particles at locations where they cannot cause any harm to the operation of the breaker. Which one of the different embodiments of the invention is selected depends on cost, flow velocity of the insulating medium, operating conditions of the switching device and available space. On the other hand, the dimensions of the elements of the baffle device 2 of all embodiments may be adjusted to specific parameters or ratings of a certain circuit breaker 1. For example, the diameter of the openings 34 of the embodiment according to FIG. 5b may be adapted to a required velocity of the insulating medium, in order for the latter to be evacuated and cooled down effectively. Such dimensions can be adjusted e.g. by conducting computer simulations showing the temperatures of the insulating medium in different parts of the circuit breaker.

In embodiments, the baffle device 2, which is a trap for particles transported by the dielectric insulating medium, is designed such that deposition of the particles inside the baffle device 2 is induced by the turbulent flow of the dielectric insulating medium.

In embodiments, turbulent flow conditions are chosen such that gravitational force allows to trap or contributes to trap particles in the baffle device 2.

In embodiments, the baffle device 2 comprises baffle plates or fins 2a, 2b, that are arranged to form cavities for capturing particles, in particular for capturing particles by gravitational force.

In embodiments, the baffle device 2 comprises baffle plates or fins 2a, 2b, that are arranged to form cavities for swirling exhaust gas inside the cavities, in particular for swirling exhaust gas and thereby capturing or contributing to capture particles inside the cavities.

While there are shown and described presently preferred embodiments of the invention, it is to be distinctly understood that the invention is not limited thereto but may otherwise variously be embodied and practised within the scope of the following claims. Therefore, terms like "preferred" or "in particular" or "particularly" or "advantageously", etc. signify optional and exemplary embodiments only.

REFERENCE LIST

1=circuit breaker
2=baffle device
2a=first fin
2b=second fin
3=first arcing contact
4=second arcing contact
5=arcing volume
6=exhaust tube
7=first exhaust volume
8=second exhaust volume
9=third volume
10=passage through exterior third volume wall, second opening
11=exterior wall of third volume
12=enclosure of circuit breaker
13=insulating nozzle
14=(first) openings of the first/second exhaust volume
15=volume delimited by enclosure
16=(auxiliary) drive for arcing second contact
17=wall of first/second exhaust volume
18=heating volume
20=particles
21=outer element of baffle device
22=inner element of baffle device
23=first annular stopper plate
24=annulus
25=annular attachment ring
26=second annular stopper plate
27=slit
a=flow directions of insulating medium
r1=outer radius of first stopper plate
r2=outer radius of attachment ring
r3=inner radius of annulus
r4=outer radius of second stopper plate
r5=inner radius of attachment ring
z=longitudinal axis
A=electric arc
G=gravitational force

The invention claimed is:

1. An electric switching device filled with a dielectric insulating medium, comprising at least an arrangement of arcing contacts with a first arcing contact and a corresponding second arcing contact, wherein for opening and closing the electric switching device at least one of the arcing contacts is movable parallel to a longitudinal axis and cooperates with the other arcing contact, wherein at least a first exhaust volume is provided downstream of the first arcing contact, and/or at least a second exhaust volume is provided downstream of the second arcing contact, with respect to a local flow direction of the insulating medium, in such a way that dielectric insulating medium can flow from an arcing volume arranged between the first and the second arcing contact into the first and/or the second exhaust volume, wherein the first and/or the second exhaust volume comprise or comprises a plurality of first openings in a wall of the first and/or second exhaust volume, through which the insulating medium can exit the first and/or the second exhaust volume into at least one third volume, wherein the at least one third volume is arranged around the first exhaust volume an/or around the second exhaust volume and is delimited in radial direction, with respect to the longitudinal axis, at least partially by the wall of the first exhaust volume and/or of the second exhaust volume and by an exterior wall, wherein the exterior wall has second openings through which the insulating medium exits the third volume towards an enclosure of the electric switching device, wherein at least one baffle device is provided inside the third volume and is arranged in such a way that a turbulent flow of the insulating medium is generated while the insulating medium passes the baffle device on a flow direction towards the second openings, wherein the baffle device is a trap for particles transported by the dielectric insulating medium, wherein turbulent flow conditions are chosen such that gravitational force allows to trap or contributes to trap particles in the baffle device, wherein the baffle device comprises baffle fins, that are arranged to form cavities for capturing the particles by gravitational force.

2. The electric switching device according to claim 1, wherein the baffle device comprises at least one first fin being attached to the wall of the first and/or the second exhaust volume and protruding inside the third volume, and/or at least one second fin being attached to the exterior wall of the third volume and protruding inside the third volume, wherein the at least one first and the at least one second fin are shifted with respect to one another in direction of the longitudinal axis.

3. The electric switching device according to claim 2, wherein the at least one first and the at least one second fin of the baffle device protrude into the third volume to such extend that the insulating medium has no straight trajectory when passing through the baffle device.

4. The electric switching device according to claim 2, wherein the at least one first and the at least one second fin are arranged perpendicularly to the longitudinal axis.

5. The electric switching device according to claim 2, wherein the at least one first and the at least one second fin are plate-shaped and extend at least along a portion of the respective wall to which they are attached.

6. The electric switching device according to claim 2, wherein the at least one baffle device comprises at least two first fins and/or at least two second fins, wherein the first fins and the second fins protrude into the third volume to such extent that a straight passage for the insulating medium is formed above the fins between free ends of the fins and the respective wall facing the free ends of the fins.

7. The electric switching device according to claim 6, wherein the first fins are arranged on a top portion of the wall of the first exhaust volume and/or the second exhaust volume, with respect to the gravitational force.

8. The electric switching device according to claim 7, wherein the top portion is a top half of said wall.

9. The electric switching device according to claim 1, wherein the at least one baffle device comprises at least two first fins and/or at least two second fins, wherein the first fins and the second fins protrude into the third volume to such extent that a straight passage for the insulating medium is formed above the fins between free ends of the fins and the respective wall facing the free ends of the fins.

10. The electric switching device according to claim 9, wherein the first fins are arranged on a top portion of the wall of the first exhaust volume and/or the second exhaust volume, with respect to the gravitational force.

11. The electric switching device according to claim 10, wherein the second fins are arranged on a bottom portion of the exterior wall of the third volume, with respect to the gravitational force.

12. The electric switching device according to claim 11, wherein the bottom portion is a bottom half of said wall.

13. The electric switching device according to claim 10, wherein the top portion is a top half of said wall.

14. The electric switching device according to claim 9, wherein the second fins are arranged on a bottom portion of the exterior wall of the third volume, with respect to the gravitational force.

15. The electric switching device according to claim 14, wherein the bottom portion is a bottom half of said wall.

16. The electric switching device according to claim 1, wherein the at least one baffle device comprises a plurality of plates connecting the exterior wall of the third volume with the wall of the first and/or the second exhaust volume and being arranged transversally to the longitudinal axis, wherein each plate has at least one opening allowing passage of the insulating medium through the plate.

17. The electric switching device according to claim 16, wherein the plates are connected to one another by at least a ring concentric to the longitudinal axis, such that at least two compartments are formed on each side of the ring in radial direction.

18. The electric switching device according to claim 17, wherein at least a part of the compartments is divided into at least two sub-compartments by at least a delimiting plate, in such a way that the sub-compartments of each compartment are not entirely geometrically separated from one another and are fluidically connected.

19. The electric switching device according to claim 17, wherein each plate has at least one opening attributed to each compartment.

20. The electric switching device according to claim 16, wherein the openings of the plates are arranged such that the insulating medium has no straight trajectory when passing through the baffle device.

21. The electric switching device according to claim 1, wherein the at least one baffle device is arranged around the first exhaust volume and/or the second exhaust volume, having an outer element comprising an annular attachment ring and a first annular stopper plate, wherein the outer element is attached on one side to the exterior wall of the third volume by means of the annular attachment ring, such that no insulating medium can pass between the annular attachment ring and said exterior wall, wherein the first annular stopper plate is attached to the annular attachment ring such that a slit is formed at a radially outer extremity of the annular attachment ring and is attached to the wall of the respective exhaust volume without forming a slit, wherein an outer radius of the first stopper plate is smaller than an outer radius of the annular attachment ring, and an inner element attached to the annular attachment ring inside the outer element and comprising an annulus and a second annular stopper plate attached to the annulus, wherein an inner radius of the annulus is smaller than the outer radius of the first annular stopper plate and an outer radius of the second annular stopper plate is smaller than the inner radius of the annular attachment ring.

22. The electric device according to claim 1, wherein the dielectric insulation medium is present that comprises an organofluorine compound selected from a group consisting of: $SF_6$, $CF_4$, fluoroethers, fluoroamines, fluorooxiranes, fluoroketones, fluoroolefins, fluoronitriles, and mixtures thereof; and/or wherein the switching device is selected from a group consisting of: circuit breaker, generator circuit breaker, load break switch, disconnector.

23. The electric switching device according to claim 22, wherein the mixture is a mixture with a background gas.

24. The electric device according to claim 1, wherein deposition of the particles inside the baffle device is induced by the turbulent flow of the dielectric insulating medium.

25. The electric device according to claim 1, wherein the baffle device comprises baffle plates or fins, that are arranged to form cavities for swirling exhaust gas inside the cavities.

* * * * *